United States Patent [19]
Calamur et al.

[11] Patent Number: 6,039,792
[45] Date of Patent: Mar. 21, 2000

[54] METHODS OF FORMING AND USING POROUS STRUCTURES FOR ENERGY EFFICIENT SEPARATION OF LIGHT GASES BY CAPILLARY CONDENSATION

[75] Inventors: Narasimhan Calamur, Lemont; Martin E. Carrera, Naperville, both of Ill.; David J. Devlin, Los Alamos; Tom Archuleta, Espanola, both of N.Mex.

[73] Assignee: Regents of the University of California and BP Amoco Corporation, Chicago, Ill.

[21] Appl. No.: 09/102,234

[22] Filed: Jun. 22, 1998

Related U.S. Application Data

[63] Continuation-in-part of application No. 08/881,711, Jun. 24, 1997, abandoned.

[60] Provisional application No. 60/050,714, Jun. 24, 1997.

[51] Int. Cl.[7] .................................................. B01D 53/22
[52] U.S. Cl. ........................... 95/45; 95/50; 95/52; 96/11; 55/524; 55/DIG. 5
[58] Field of Search ............................ 55/524; 96/11–13; 427/249, 255.5; 95/45, 50, 52; 210/640

[56] References Cited

U.S. PATENT DOCUMENTS

| | | | |
|---|---|---|---|
| 3,022,187 | 2/1962 | Eyraud et al. ........................... | 96/11 X |
| 3,511,031 | 5/1970 | Ketteringham et al. ...................... | 96/8 |
| 3,717,525 | 2/1973 | Bültemann .............................. | 96/11 X |
| 4,583,996 | 4/1986 | Sakata et al. ............................. | 95/50 |
| 4,689,150 | 8/1987 | Abe et al. ............................... | 96/11 X |
| 4,746,341 | 5/1988 | Komoda ................................. | 55/524 X |
| 4,784,880 | 11/1988 | Coplan et al. ........................... | 96/12 X |
| 4,865,630 | 9/1989 | Abe ..................................... | 96/11 |
| 4,971,696 | 11/1990 | Abe et al. ............................... | 96/11 X |
| 5,057,641 | 10/1991 | Valus ................................... | 585/818 |
| 5,104,425 | 4/1992 | Rao et al. ............................... | 96/11 X |
| 5,198,006 | 3/1993 | Mimori et al. ........................... | 55/524 X |
| 5,236,474 | 8/1993 | Schofield et al. ......................... | 95/50 X |
| 5,238,569 | 8/1993 | Soria et al. ............................. | 96/12 X |
| 5,250,184 | 10/1993 | Maier ................................... | 96/11 X |
| 5,256,295 | 10/1993 | Baker et al. ............................. | 95/45 X |
| 5,318,688 | 6/1994 | Najjar et al. ............................. | 205/150 |
| 5,358,553 | 10/1994 | Najjar et al. ............................. | 96/11 |
| 5,415,891 | 5/1995 | Liu et al. ............................... | 96/11 X |
| 5,487,774 | 1/1996 | Peterson et al. .......................... | 96/11 X |
| 5,582,735 | 12/1996 | Mancusi, III et al. ...................... | 95/45 X |
| 5,611,842 | 3/1997 | Friesen et al. ........................... | 95/45 X |
| 5,702,503 | 12/1997 | Tang .................................... | 96/13 X |
| 5,716,527 | 2/1998 | Deckman et al. ........................ | 96/11 X |
| 5,843,209 | 12/1998 | Ray et al. .............................. | 95/45 X |

FOREIGN PATENT DOCUMENTS

| | | | |
|---|---|---|---|
| 61-209005 | 9/1986 | Japan ........................................ | 96/11 |
| 61-238303 | 10/1986 | Japan ........................................ | 96/11 |
| 61-328303 | 10/1986 | Japan ........................................ | 96/11 |
| 62-121616 | 6/1987 | Japan ........................................ | 96/11 |
| 63-185428 | 8/1988 | Japan ........................................ | 96/13 |
| 3242231 | 10/1991 | Japan . | |

OTHER PUBLICATIONS

R. Ash et al—"Flow of Adsorbable Gases and Vapours in a Microporous Medium; I. Single Sorbates"; Proc. Roy. Soc.; vol. 271; Jan. 1, 1963, pp. 1–17.

R. Ash et al—"Flow of Adsorbable Gases and Vapours in a Microporous Medium; II. Binary Mixtures"; Proc. Roy. Soc.; vol. 271, Jan. 1, 1963, pp. 20–33.

H. Rhim et al—"Transport of Capillary Condensate"; Journal of Colloid and Interface Science, vol. 52, No. 1 Jul. 1975; pp. 174–181

M. Asaeda et al—"Separation of Alcohol/Water Gaseous Mixtures by Thin Ceramic Membrane"; Journal of Chemical Engineering of Japan; vol. 19. No. 1, 1986; pp. 72–77.

D. P. Sperry et al—"Methanol–Hydrogen Separation by Capillary Condensation in Inorganic Membranes"; Journal of Membrane Science, 60 (1991) pp. 185–193; Elsevier Science Publishers B.V., Amsterdam.

R. J. R. Uhlhorn et al—"Gas Transport and Separation With Ceramic Membranes; Part I. Multilayer Diffusion and Capillary Condensation"; Journal of Membrane Science, 66 (1992) pp. 259–269; Elsevier Science Publishers B.V., Amsterdam.

M. B. Rao et al—"Nanoporous Carbon Membranes for Separation of Gas Mixtures by Selective Surface Flow"; Journal of Membrane Science, 85 (1993) pp. 253–264; Elsevier Science Publishers B.V., Amsterdam.

D. J. Devlin et al—"Membrane Systems for Energy Efficient Separation of Light Gases"; Advanced Industrial Materials (AIM) Program; Annual Progress Report; FY 1996 Published Apr. 1997.

*Primary Examiner*—Robert H. Spitzer
*Attorney, Agent, or Firm*—Frederick S. Jerome; Mary Jo Kanady; Wallace L. Oliver

[57] ABSTRACT

The present invention relates to an improved method and apparatus for separating one or more condensable compounds from a mixture of two or more gases of differing volatilities by capillary fractionation in a membrane-type apparatus, and a method of forming porous structures therefor. More particularly, the invention includes methods of forming and using an apparatus consisting, at least in part, of a porous structure having capillary-type passages extending between a plurality of small openings on the first side and larger openings on a second side of the structure, the passages being adapted to permit a condensed liquid to flow therethrough substantially by capillary forces, whereby vapors from the mixture are condensed, at least in part, and substantially in and adjacent to the openings on the first side, and are caused to flow in a condensed liquid state, substantially in the absence of vapor, from the openings on the first side to the openings on the second side.

22 Claims, 3 Drawing Sheets

METHODS OF FORMING AND USING POROUS STRUCTURES FOR ENERGY EFFICIENT SEPARATION OF LIGHT GASES BY CAPILLARY CONDENSATION

CROSS-REFERENCE TO RELATED APPLICATIONS

This application is a continuation-in-part of application Ser. No. 08/881,711 filed Jun. 24, 1997, now abandoned, and instant application also claims the benefit of U.S. Provisional Application No. 60/050714 filed Jun. 24, 1997, which related applications are specifically incorporated herein in their entirety by reference.

FIELD OF THE INVENTION

The present invention relates to an improved method and apparatus for separating one or more condensable compounds from a mixture of two or more gases of differing volatilities with the aid of a defined porous structure, and a process of forming the porous structure. More particularly, the invention includes methods forming and using an apparatus consisting, at least in part, of a porous structure having capillary-type passages extending between openings on one side of the membrane and openings on the other side of the membrane. The capillary-type passages are adapted to be wetted and filled, at least in part, by the liquid condensate resulting from the condensation of a vapor mixture, with the consequent formation of menisci in the capillary-type passages and the generation of capillary pressures that cause the condensed liquid to be lodged within the capillary-type passages and transmitted through the plate while preventing the passage of vapor. A porous structure is provided, including a substrate having a defined pore structure, and a coating layer on a surface of the substrate, the coating layer having a pore structure smaller dimension than the pore structure of the substrate.

The porous structure is advantageously made from a substrate having a controlled pore structure by depositing a coating layer onto a surface of a substrate having a defined pore structure. Deposition, which can be by sputtering or evaporation of a coating material, is applied at an angle of from about 45 to 85 degrees from the perpendicular to the surface and at temperatures and pressures sufficient to form a porous structure in the coating layer, the porous structure in the surface layer characterized as having a pore structure of smaller dimension than the pore structure of the substrate.

This invention was made with government support under Contract No. W-7405-ENG-36 awarded by the U.S. Department of Energy. The government has certain rights in the invention.

BACKGROUND OF THE INVENTION

As is well known to those skilled in the art, it may be desirable or necessary to separate various components from the streams in which they are found in commercial operations. In the field of chemical processes, for example, it may be desirable to effect a separation between hydrogen and hydrocarbon gases in order to obtain one or the other or both in enriched or purified state. Prior art techniques to effect this separation include distillation—but distillation is characterized by high initial capital costs and substantial operating costs, which costs generally increase as operating conditions deviate from ambient conditions.

There is, in particular, considerable commercial interest in separating various aliphatically unsaturated hydrocarbons from mixtures containing them. These unsaturated hydrocarbons are reactive materials that serve in various roles, generally as intermediates in chemical syntheses. A number of the unsaturated hydrocarbons are employed as monomers in the formation of polymers and, in this regard, olefins such as ethylene, propylene and butadiene are well known. These olefins, as well as other unsaturated materials, for instance acetylene, are also used to form relatively low molecular weight products.

The aliphatically unsaturated hydrocarbons are most often available on a commercial basis in admixture with other chemical compounds, frequently other hydrocarbons. These hydrocarbon-containing streams are usually by-products of chemical syntheses or separation processes. When the hydrocarbon streams are liquid under normal conditions or can readily be made so, ordinary distillation techniques can be used to separate the hydrocarbon components providing they have sufficiently different boiling points for the process to be economically feasible. Especially when the hydrocarbon mixtures contain materials having close boiling points, which is often the case with hydrocarbons of the same number of carbon atoms or having a difference of only one carbon atom, distillation may not be an attractive separation procedure. In such cases, more costly processes are often used and involve operations such as solvent extraction or extractive distillation which entail considerable expense, if indeed they are technically feasible in a given situation.

Cryogenic distillation is the primary means used commercially to separate feeds which are gaseous under ambient conditions, such as olefins from hydrocarbons of the same number of carbon atoms. This type of process, however, is very costly, in terms of both capital and operating expenses, particularly for components with similar boiling ranges, such as ethylene/ethane, propylene/propane, butylenes/butanes, nitrogen/oxygen and the like.

When the mixture containing the aliphatically unsaturated hydrocarbon is in an essentially gaseous state at normal or ambient conditions of temperature and pressure, separation of the desired component from the mixture may be even more troublesome. In these situations cryogenic processes may be used, but they are expensive. The components of these normally gaseous mixtures may not even have particularly close boiling points, but nevertheless the mixture must be cooled in order to separate one or more of its components. In spite of the considerable cost of cryogenic operations, the procedure has been employed commercially for the separation of ethylene from other gaseous materials such as ethane and methane.

Evaporation of a liquid and separation of its components has been investigated somewhat thoroughly. The generally accepted theory of evaporation is that the molecules of the substance are in continuous motion and are bound to each other by various molecular forces. The energy of the molecules follows a distribution, and statistical theory holds that the distribution is generally bell-shaped. Evaporation occurs when molecules having higher than average energy escape from an exposed surface of the substance when their velocity is too great to be restrained by the molecular forces. The molecules which escape from the exposed surface also have a distribution of energies and they exert a partial pressure corresponding to the physical and chemical nature of the evaporating substance in conjunction with surrounding conditions such as pressure and temperature. The escaped molecules continue their motion, but being freed from the mother-liquid they are able to travel longer distances. The ability of these molecules to move in the gaseous state is described in terms of molecular mean free path, which is the average distance between collisions. By traveling away from the liquid, the evaporated molecules build a mass transfer boundary layer where the concentration of the evaporated substance decreases rapidly with the distance from the mother-liquid.

Formation of a liquid phase from the vapor at any pressure below saturation and/or evaporation in a porous solid have been the subjects of much theoretical and/or experimental research. Such work provides a number of simple, though necessarily idealized pore models: the cylinder, the parallel-sided slit, the wedge-shape, and the cavity between spheres in contact. For discussions of the progress of capillary condensation and evaporation in idealized pores see, for example, J. H. de Bore, "The Structure and Properties of Porous Materials" (eds. D. H. Everett and F. S. Stone), p. 68–141, Butterworths, London (1958), D. H. Everett, "The Solid-Gas Interface" (ed E. A. Flood), Vol. 2, p. 1055–1113, Dekker, N.Y. (1967), and more recently, S. J. Gregg "Adsorption, Surface Area and Porosity" 2Ed p. 116–129, Academic Press, New York (1982).

There currently also exists a number of methods for the selective separation of gaseous feed stream components, including the removal of light olefins from gas streams containing other non-olefinic components. While there has been interest in using membranes as a means of separation, the lack of high flux/high selectivity membranes economically suitable for an industrial setting has hindered the application of membranes for this purpose. Ideal characteristics for membranes for separation purposes include the ability of the membrane to maintain its integrity under high pressure and severe environmental conditions; to achieve high performance levels; to maintain high performance levels for an economical period of time in order to produce consistent and reliable results; to be easily assembled from commercially available components or manufactured with relative ease; and to be technically feasible. The present state of membrane technology offers a number of different membrane systems which attempt to achieve the various characteristics stated above. See, for example, U.S. Pat. No. 4,784,880 (November, 1988) Coplan et al., U.S. Pat. No. 4,971,696 (November, 1990) Abe et al., U.S. Pat. No. 5,104,425 (April, 1992) Rao et al., U.S. Pat. No. 5,238,569 (August, 1993) Soria et al., U.S. Pat. No. 5,415,891 (May, 1995) Liu et al., U.S. Pat. No. 5,487,774 (January, 1996) Peterson et al., U.S. Pat. No. 5,702,503 (December, 1997) Tse Tang, or U.S. Pat. No. 5,716,527 (February, 1998) Deckman et al.

Although the study of separation of gases mixtures by permeation through microporous membranes has been carried out by numerous researchers, most have not studied conditions under which capillary condensation occurs. This research has focused primarily upon membrane separation by selective permeation where one or more compounds passes through the membrane due to differences in the size or shape of the molecules. Another general class of membrane process achieves separation based upon the selective reaction of certain compounds with a reactant fluid on the other side of the membrane. A few publications have reported the permeation of capillary condensate in inorganic, microporous media. See, for example, U.S. Pat. No. 5,057,641 (October, 1991) Valus et al., U.S. Pat. No. 5,318,553 (June, 1994) Najjar et al., or U.S. Pat. No. 5,358,553 (October, 1994) Najjar et al.

In general, applying a trans-membrane mixed-gas pressure across a porous membrane may or may not cause separation of the co-permeating components. If the gas molecules collide preferentially with each other instead of the pore wall (that is, the pore diameter exceeds the bulk mean free path), a theory of viscous flow applies and no separation occurs. On the other hand, if the mean free path between collisions in a normal bulk-gas phase of equal pressure exceeds the pore size of the membrane, separation can occur. The latter process, termed "Knudsen diffusion," is promoted by operation at low pressures or by using membranes with small pores at elevated pressures. The more rapidly moving low-molecular-weight gas executes more frequent diffusional steps because it hits the wall more frequently. The ratio of wall collisions in this limit scales with the square root of penetrant molecular weight; so, the Knudsen selectivity equals the square root of the molecular-weight ratio of the largest to smallest gas. This principle was used for isotope enrichment using a non-condensable gas on the Manhattan Project, but it is uneconomical for commercial separation applications.

For more-condensable components a process, believed to involve surface adsorption, can occur on internal pore surfaces. In such condensable systems, an additional contribution to transport, termed surface diffusion, occurs in combination and even in competition with Knudsen flow. This phenomenon can be used for gas/vapor separations because it leads to blockage of the Knudsen diffusion passages that are otherwise available to noncondensable gases. Under selected conditions, high selectivities in favor of the more-condensable component have been reported.

M. B. Rao and S. Sircar, Journal of Membrane Science, 85, p. 253 (1993), reported an example of nanoporous selective surface adsorption membrane. The membrane studied had pore sizes in the range of 5–6 Angstroms, and were produced by carbonization of polyvinylidene chloride. Applying a transmembrane mixed-gas pressure across this nanoporous polymeric membrane is said to enrich a medium-purity, hydrogen-containing stream (20–60% $H_2$) before it is further purified in a pressure swing adsorption (PSA) unit. The nanoporous polymeric membrane may also remove some highly condensable hydrocarbons that would complicate operation of the PSA unit. Hydrogen was selectively rejected in the membrane while higher-molecular-weight components, such as C3–C5 hydrocarbons, passed to the low-pressure side of the membrane. In principle, this approach might eliminate the need to recompress the majority gas, $H_2$. By contrast, using conventional size-selective membranes, the $H_2$ typically passes into the permeate and requires expensive recompression.

Examples of selective surface adsorption membranes based on compressed carbon pellets, Vycor glass, alumina, silica, and large pore zeolites have also been reported.

Although the study of separation of gaseous mixtures by permeation through microporous inorganic membranes has been carried out by numerous researchers, most have not studied conditions under which capillary condensation occurs. A few publications have reported the permeation of capillary condensate in inorganic, microporous media.

Ash, Barrer and co-workers report having observed the capillary condensation effect experimentally, R. Ash, R. M. Barrer and C. G. Pope, "Flow of Adsorbable Gases and Vapors in a Microporous Medium. I. Single Sorbates" and "Flow of Adsorbable Gases and Vapors in a Microporous Medium. II. Binary Mixtures" Proc. Roy. Soc A, 271, January, 1993, pp 1 to 33, and R. Ash, R. M. Barrer and R. T. Lowson, "Transport of Single Gas and Binary Gas Mixtures in a Microporous Carbon Membrane" J. Chem. Soc., Faraday Trans. I, 69 (1973) p 2166. They studied various gas mixtures in microporous carbon membranes and they described a "blocking" effect whereby the condensed phase in the membrane eliminated or "blocked" the transport of non-condensed species.

Hannong Rhim and Sun-Tak Hwang developed a model for flow of capillary condensate and measured individual permeation rates of $C_2H_6$, $n-C_4H_{10}$, and $CO_2$ through porous Vycor glass, "Transport of Capillary Condensate", J. Colloid and Interface Sci., 52 (1) July, 1975, pp 174 to 181. Permeabilities of these gases go through maxima with increasing pressure (from 0.6 to 0.8 P sat.), then fall off rapidly as the condensate flow fills increasing amounts of the pore volume.

Later, Lee and Hwang, measured permeation of Freon 113 and $H_2O$ through Vycor glass membranes and compared their experimental results to an improved model ("The Transport of Condensable Vapors Through a Microporous Vycor Glass Membrane", J. Colloid Interface Sci., 110(2) p 544 (1986)). Their model depended on the pressures on each side of the membrane and on independently measured adsorption isotherms. Using the Kelvin equation with corrections for adsorbed layer thickness and vapor pressure reduction in their model, they obtained good agreement between calculated and measured permeabilities.

Masashi Asaeda and Luong Dinh Du reported separation of gaseous mixtures of alcohol and water using a 10 $\mu$m thick alumina membrane modified with non-calcined silicates with 3 nanometer (nm) pores, Journal Chemical Engineering, Japan, 19 (1) (1986) p 72 to 77 and 84 to 85,). The azeotropic points encountered in distillation were bypassed. At the minimum condensation pressure the concentration of alcohol in the condensate is much higher than the azeotropic concentration. Temperatures at which these membranes can be used, however, are limited to 90° to 100° C., due to the materials used.

R. J. R. Uhlhorn, K. Keizer and A. J. Burggraf reported separation of $C_3H_6/N_2$ (60/40) mixtures by preferentially permeating $C_3H_6$ through a supported $\gamma$-$Al_2O_3$ film, Journal of Membrane Science, 66, (1992) p. 259–269. Their two layer support was described as consisting of a 2 mm thick layer (pore diameter 5 $\mu$m, porosity 40%), on top of which a 30 $\mu$m thick intermediate layer (pore diameter 0.2 $\mu$m, porosity 45%) was deposited. A 5 $\mu$m thick $\gamma$-$Al_2O_3$ film top layer was synthesized on this support. Slit shape pores formed in the $\gamma$-$Al_2O_3$ film and were reported to have lengths much larger than widths theoretically comparable to the space between two parallel, infinite planes. Uhlhorn et al. state that, in this configuration, resistance to gas and vapor phase transport is determined by the $\gamma$-$Al_2O_3$ top layer only and not by the support. Helium was used downstream (and below the membrane) as a sweep gas to reduce the effect of concentration polarization. Occurrence of a maximum in the permeability was said to coincide with blocking of the pores by adsorbate. Using MgO-modified membranes to decrease the pore size, they obtained separation factors as high as 80. However, the permeability of propylene decreased by a factor of 20. They also observed hysteresis in the separation factors as a function of $C_3H_6$ partial pressure, depending on whether the test pressure was approached from above or below.

In a recent study, David P. Sperry, John L. Falconer and Richard D. Noble separated $CH_3OH/H_2$ mixtures in an alumina membrane with approximately 2.5-nm diameter pores, "Methanol-Hydrogen Separation by Capillary Condensation in Inorganic Membranes, J. Membrane Sci. 60 (1991) pp 185 to 193. The $H_2$ permeability decreased by three orders of magnitude when capillary condensation of $CH_3OH$ occurred. The $CH_3OH$ permeation rate actually increased slightly after capillary condensation occurred. Measurements were taken up to 473° K.

It is an object of this invention to provide a novel membrane system particularly characterized by its ability to separate condensable compounds from a gaseous mixture of two or more chemical compounds of differing volatilities without requiring a high differential pressure across the membrane.

Another object of the invention to provide a novel membrane system particularly characterized by its ability to separate condensable compounds from a gaseous mixture of two or more chemical compounds of differing volatilities at reduced pressures and temperatures and increased selectivity by selective condensation within the capillary structure of the membrane.

Another object of the invention is to provide a process of forming a membrane capable of separating condensable compounds from a gaseous mixture of two or more chemical compounds of differing volatilities, preferably by capillary condensation without need for cryogenic conditions of low temperature and high pressure, and/or without requiring a high differential pressure across the membrane.

Other objects and advantages of the invention will be apparent to those skilled in the art from a review of the following detailed description, taken in conjunction with the drawing and the appended claims.

SUMMARY OF THE INVENTION

The present invention provides methods and membrane-type apparatus for separating one or more condensable compounds from a mixture of two or more gases of differing volatilities utilizing a defined porous structure under conditions of low differential pressure across the membrane. Typically during operation, differential pressures across the membrane are in a range downward from about 10 pounds per square inch (psi), preferably in range from about 0 to less than about 5 psi, and more preferably less than about 1 psi.

The invention is, broadly speaking, a method for separating one or more condensable compound from a gaseous mixture of two or more compounds of differing volatilities, comprising:

(A) contacting, under condensing conditions, a gaseous mixture comprising vapors of a more volatile component and a less volatile component with a first side of a solid porous structure having passages extending between a plurality of small openings on the first side and larger openings on a second side of the structure, the passages being adapted to permit a condensed liquid to flow therethrough substantially by capillary forces, whereby vapors from the mixture are condensed, at least in part, and substantially in and adjacent to the openings on the first side, and are caused to flow in a condensed liquid state, substantially in the absence of vapor, from the openings on the first side to the openings on the second side; and (B) maintaining conditions of a gaseous sweep adjacent the second side of the porous structure, whereby the liquid condensate of vapor from the mixture in and adjacent to the openings of the passages on the second side is caused to evaporate, and, additionally, the liquid condensate is transferred substantially by capillary forces through the passages from the openings on the first side to the openings on the second side.

Preferred embodiments of the invention also include the steps:

(C) removing from adjacent to the second side the gaseous sweep containing a higher concentration of the more volatile component relative to the less volatile component therein; and (D) removing from adjacent to the first side a gaseous product containing a lower concentration of the more volatile component relative to the less volatile component.

The capillary-type passages are adapted to be wetted and filled, at least in part, by the liquid condensate resulting from the condensation of a vapor mixture, with the consequent formation of menisci in the capillary-type passages and the generation of capillary pressures that cause the condensed liquid to be lodged within the capillary-type passages and transmitted through the plate while preventing the passage of vapor. A vapor mixture produced by boiling the liquid mixture is brought into contact with one side of the plate containing capillary-type passages, where the vapor mixture is substantially condensed in and near the adjacent openings of such passages, and the condensed liquid is transmitted through the passages to the other side of the plate where it is boiled substantially in and adjacent to the openings of such passages. The capillary pressure differential required to cause the condensed liquid to flow is produced by the boiling of the condensed liquid, and the heat required for such boiling preferably is obtained, at least in substantial part, by conduction of the heat of condensation through the plate.

In yet another aspect, the invention is a process of forming a composite porous structure for separating one or more condensable compounds from a gaseous mixture of two or more compounds of differing volatilities, which process includes depositing a coating layer onto one surface of a substrate having a defined pore structure, wherein the substrate is rotated about an axis normal to the surface during the deposition which is carried out by sputtering or evaporation at an oblique angle of from about 45 to 85 degrees from the perpendicular to the surface, and at temperatures and pressures sufficient to form a plurality of pores in the coating layer. The process provides a composite porous structure wherein the substrate and the coating layer have a tapered pore structure characterized as tapering from a large dimension at one surface of the substrate to a smaller dimension at the coating layer on an opposing surface of the substrate.

Solid porous structures of the invention advantageously comprise a substrate having a thickness in the range of from about 10 to about 1000 microns, preferably about 20 microns to about 500 microns, and more preferably about 40 microns to about 250 microns. Openings on the first side have size, diameter, and/or other characteristic dimension, in a range of from about 10 nanometers to about 1000 nanometers, preferably about 20 nanometers to about 500 nanometers, and more preferably about 40 nanometers to about 250 nanometers. The smaller openings on the second side have size, diameter, and/or other characteristic dimension in a range downward from about 0.5 to about 0.1 the size of the openings on the first side.

Preferably the substrate is an alumina filter having a bulk structure with channels of diameter in a range from about 100 nanometers to about 500 nanometers, and a surface layer on a face of the bulk structure having pore sizes about 0.1 the diameter of the channels. Preferably the coating layer is characterized as having pore dimensions of from about 4 nanometers to about 5 nanometers.

Solid porous structures of the invention are advantageously formed by a process comprising depositing a coating layer onto one surface of a substrate having a defined pore size, wherein the deposition is carried out by sputtering or evaporation at an oblique angle of from about 45 to 85 degrees from the perpendicular to the surface, and at temperatures and pressures sufficient to form a plurality of pores in the coating layer, which pores are characterized as having a size of smaller dimensions than the pores of the substrate. Preferably the substrate is rotated about an axis normal to the surface during the deposition.

A particularly suitable substrate is an alumina filter having a bulk structure of thickness in the range of from about 10 microns to about 1000 microns with channels of diameter in a range from about 100 nanometers to about 500 nanometers, and a surface layer on a face of the bulk structure. The surface layer is characterized as having pore sizes downward from about 0.5 to about 0.1 the diameter of the channels, and preferably about 0.1 the diameter of the channels.

In another aspect the invention is a membrane for separating one or more condensable compounds from a gaseous mixture of two or more compounds of differing volatilities, comprising a solid porous structure having tapered passages extending between openings on a first side and a plurality of smaller openings on an opposing second side of the structure, wherein the solid porous structure is formed by a process which comprises depositing a coating layer onto one surface of a substrate having a defined pore structure, wherein the substrate is rotated about an axis normal to the surface during the deposition which is carried out by sputtering or evaporation at an oblique angle of from about 45 degrees to 85 degrees from the perpendicular to the surface, and at temperatures and pressures sufficient to form a plurality of pores in the coating layer, which pores are characterized as having a size of smaller dimensions than the pores of the substrate. Preferably the deposition is at an oblique angle of from about 70 degrees to 80 degrees from the perpendicular to the surface.

Advantageously the substrate is an alumina filter having a bulk structure of thickness in the range of from about 10 microns to about 1000 microns with channels of diameter in a range from about 100 nanometers to about 500 nanometers, and a surface layer on a face of the bulk structure having pore sizes about 0.1 the diameter of the channels. Preferably the substrate is an is alumina filter having a bulk structure with channels about 200 nanometers in diameter, and a surface layer on a face of the bulk structure having pore sizes about 20 nanometers in diameter. Preferably the coating layer is of carbon, and the coating layer is characterized as having pore dimensions of from about 4 nanometers to about 5 nanometers.

BRIEF DESCRIPTION OF THE DRAWINGS

The appended claims set forth those novel features which characterize the present invention.

The present invention itself, as well as advantages thereof, may best be understood, however, by reference to the following brief description of preferred embodiments taken in conjunction with the annexed drawing, in which.

For a more complete understanding of the present invention, reference should now be made to the embodiments illustrated in greater detail in the accompanying drawing and described below by way of examples of the invention.

BRIEF DESCRIPTION OF THE INVENTION

Condensation conditions are any set of physical conditions under which there is or can be formed a noticeable interface between liquid and vapor, i.e., conditions of temperature, pressure, and composition at which properties such as density of liquid and vapor are not identical.

Suitable membranes may be generally selected from a class of solid porous materials with structures advantageously having capillary-type passages directly through the membrane. Capillary-type passages preferably extend between openings from one side of the membrane to a plurality of smaller openings on the other side of the membrane. Such membranes are typically made from a solid porous material having a predetermined pore size which is subsequently modified to provide the plurality of smaller openings.

A preferred class of solid porous structures of the invention are made by depositing a coating layer onto one surface of a substrate preferably having a columnar pore structure. The deposition is advantageously carried out by sputtering or evaporation at an oblique angle of from about 45 to 85 degrees from the perpendicular to the surface of the porous substrate, and at temperatures and pressures sufficient to form a plurality of pores in the coating layer, which pores are characterized as having a size of smaller dimensions than the pores of the substrate. Such solid porous structures are characterized as having passages extending between openings on the first side and a plurality of smaller openings on a second side of the structure, the passages being adapted to permit a condensed liquid state to flow therethrough substantially by capillary forces.

Figure 1:
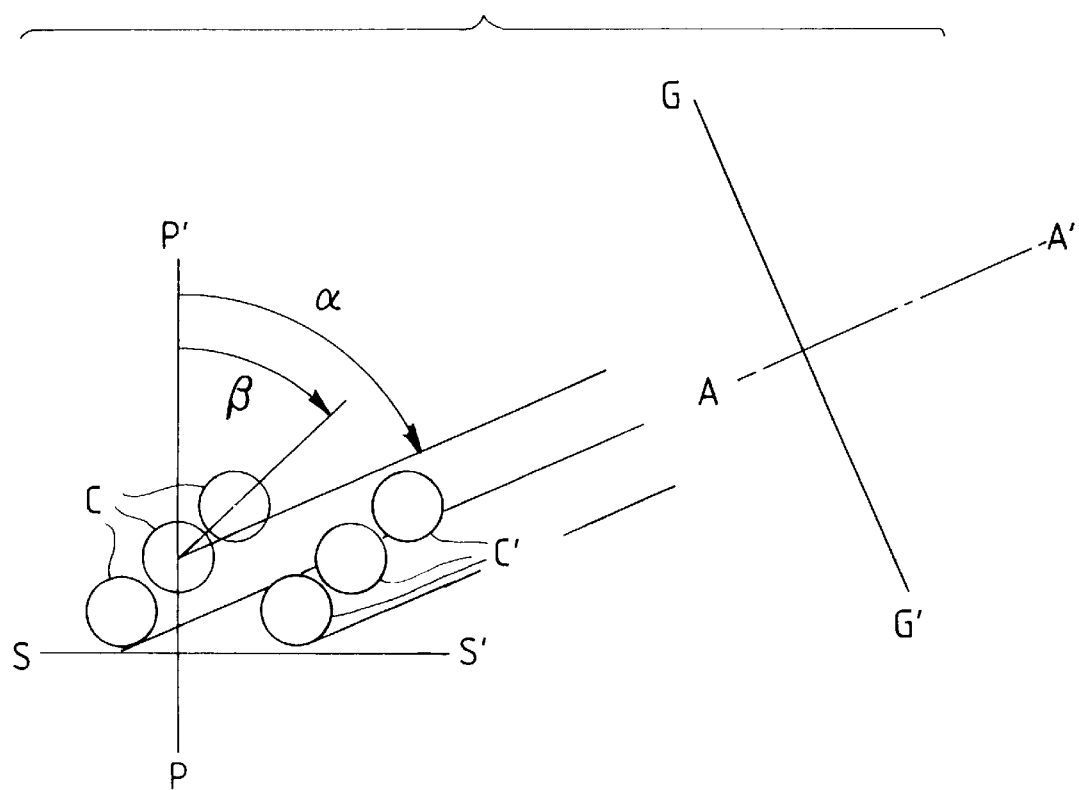
FIG. 1 is a diagram illustrating a suitable arrangement for coating a substrate to form the porous structure of the present invention.

Membranes comprising solid porous structures of the present invention have a controlled, well-defined pore structure, i.e., controlled pore sizes. The structure typically includes columnar grains separated by porous regions leading to the columnar pore structures. Membrane structure is dependent upon various parameters during formation, including substrate temperature, deposition rate, ambient atmosphere, angle of incidence of the deposited material, and the energy of the depositing flux. In FIG. 1, line SS' represents a flat non-porous surface, line PP' is a surface normal, circles C and C' represent particles deposited on the surface from the face GG' from a sputter gun along axis AA'. The direction of columnar growth on a theoretically flat, non-porous surface is typically related to the angle of incidence of the depositing flux according to the relationship known as the tangent rule:

$$\tan(\beta) = \tfrac{1}{2} \tan(\alpha)$$

where $\alpha$ is the angle between the surface normal and the direction of the vapor flux, and $\beta$ is the angle between the surface normal and the growth direction as shown in FIG. 1. While the exact relation may not always hold, it is generally found that the angle $\beta$ is less than $\alpha$, and the effect is a consequence of a process referred to as "self-shadowing". This occurs when deposited atoms exposed to the incoming vapor flux shield the substrate or unoccupied sites from direct impingement. When surface mobility is low enough such that rearrangement to fill the shielded sites is not possible, very small columnar pores result.

It has now been found that a coating with such very small columnar pores can be formed on a porous substrate which has passages extending between openings on the first side and openings on a second side of the substrate. The desired porous coating is formed bridging across openings in the substrate from about 2 to 10 diameters of the very small columnar pores of the coating layer by sputtering or evaporation at an oblique angle of from about 45 to 85 degrees from a line perpendicular to the surface, and at temperatures and pressures sufficient to form a plurality of pores in the coating layer. Very small pores through the coating layer are characterized as having a size of smaller dimensions than the pore of the substrate. During the deposition the substrate is advantageously rotated about an axis normal to the surface. Such rotation is believed to taper or neck-down the pores in the substrate near the surface and thereby provide preferred embodiments of the invention.

Materials for coating a porous substrate may be any material capable of sputtering or evaporation. Carbon is a preferred material.

Suitable solid porous structures typically include a substrate having a thickness in the range of from about 10 microns to about 1000 microns, preferably 20 microns to 500 microns, and more preferably 40 microns to 250 microns.

Openings on the first side have sizes or other characteristic dimension in a range of from about 10 nanometers to about 1000 nanometers, preferably about 20 nanometers to about 500 nanometers, and more preferably about 40 nanometers to about 250 nanometers.

Substrates on which carbon or other material is deposited include alumina,. silica, carbon, or other material such as a plastic or polymer, i.e., polycarbonate and the like, with a defined initial pore structure. An alumina substrate such as an anodized alumina filter pad is a preferred initial substrate.

Dimensions of the very small pores are dependent on the incident angle and size of the shadowing atom, cluster or nuclei. Crystallographic effects can also be important in defining the resultant grain structure. Substrate temperature and therefore mobility will effect nuclei size and rearrangement. Lower substrate temperature results in lower mobility. Also, the energy and distribution of the atomic flux and degree of thermalization of the beam is important. For carbon materials sputter deposited at room temperature, the surface mobility is low. Sputtering at an oblique angle, generally from about 45 to 85 degrees, preferably from about 60 to 80 degrees, and most preferably from about 70 to 80 degrees measured from a line perpendicular to the surface, is expected to produce a columnar structure.

Figure 3:
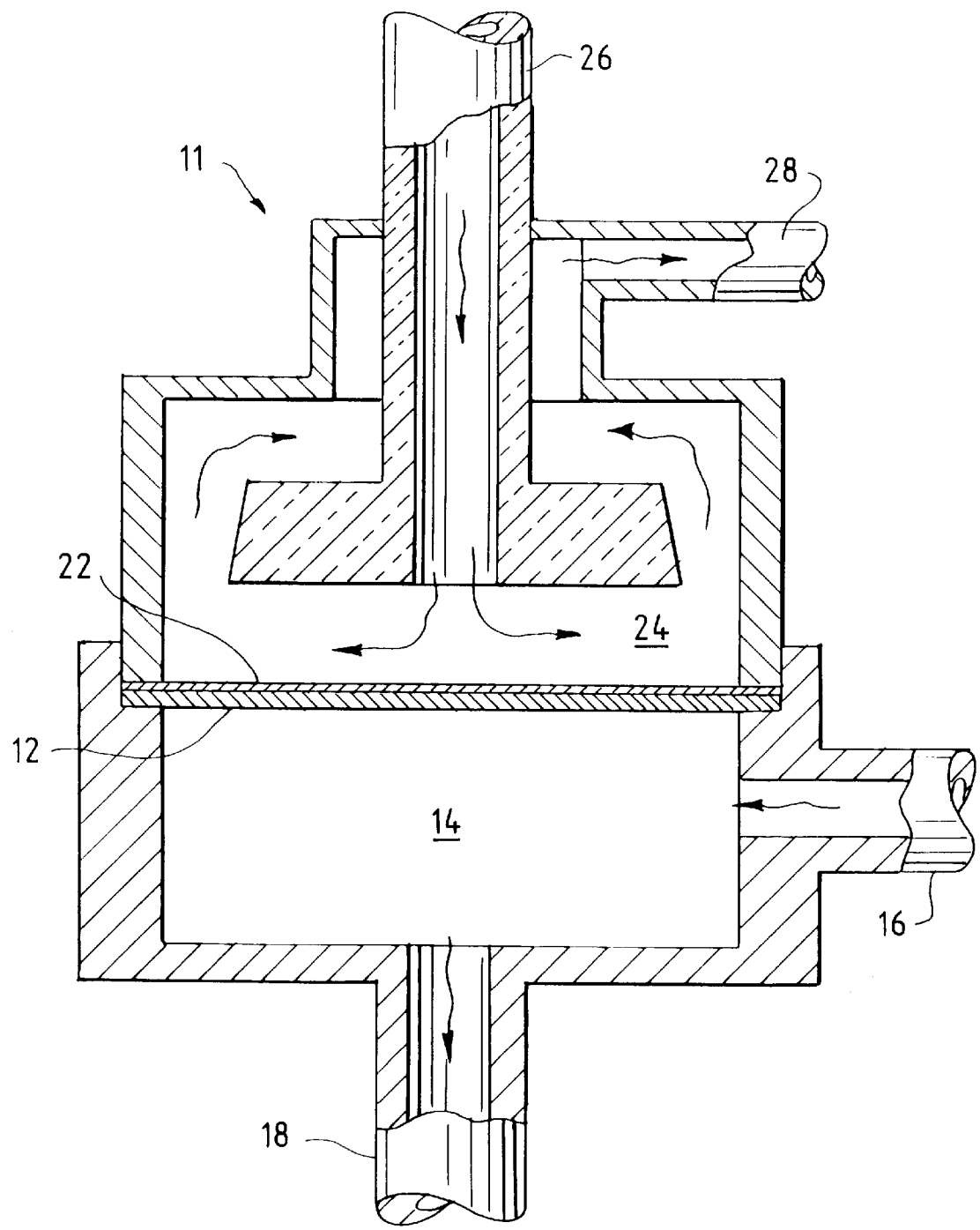
FIG. 3 is a sectional view depicting laboratory apparatus consisting of an upper chamber and a lower chamber separated by a thin membrane.

The substrate used for the deposition of the carbon films was an anodized alumina filter made up of straight pores with uniform dimensions. Anodisc (R) 470 filters, available from Whatman International, Ltd., contain channels 200 nanometers in diameter and 60 microns in length with 20 nanometers diameter pores in a membrane surface layer approximately 100 nanometers thick on one side of the filter. Anodisc (R) filters include an Anopore (R) membrane with a polypropylene ring support. The pore size distribution is uniform, and the pores as shown in FIG. 3 are straight. The fine pore size of the filter provides a suitable substrate for the deposition of carbon films with a 4 to 5 nanometer pore dimension. Films were deposited with a 10 centimeter diameter RF powered magnetron sputter gun in a high vacuum ($10^{-6}$ to $10^{-7}$ Torr) system. A suitable deposition arrangement is shown in FIG. 1.

Substrates were set at an angle with respect to the gun and rotated. Rotation of the stage improved uniformity and altered the microstructure. Typical sputter conditions can include argon pressures of from about 0.01 to about 0.5 Pascal (Pa), preferably from about 0.1 to 0.3 Pa, and RF power of about 90 watts. Deposition rates were on the order of 100 nm/hr, but could be higher or lower depending on other controlled factors, and the angle of incidence was varied from 0 degrees to 85 degrees measured from the perpendicular to the surface. Advantageously an oblique angle is used, generally from about 45 degrees to 85 degrees, preferably from about 65 to 85 degrees, and most preferably from about 70 to 80 degrees.

As a check against the possibility that the film structure and pore size were artifacts of the substrate surface and not due to the oblique deposition angle, samples were also prepared at normal angles of incidence with rotation. No porosity was evident in the carbon film.

Figure 2:
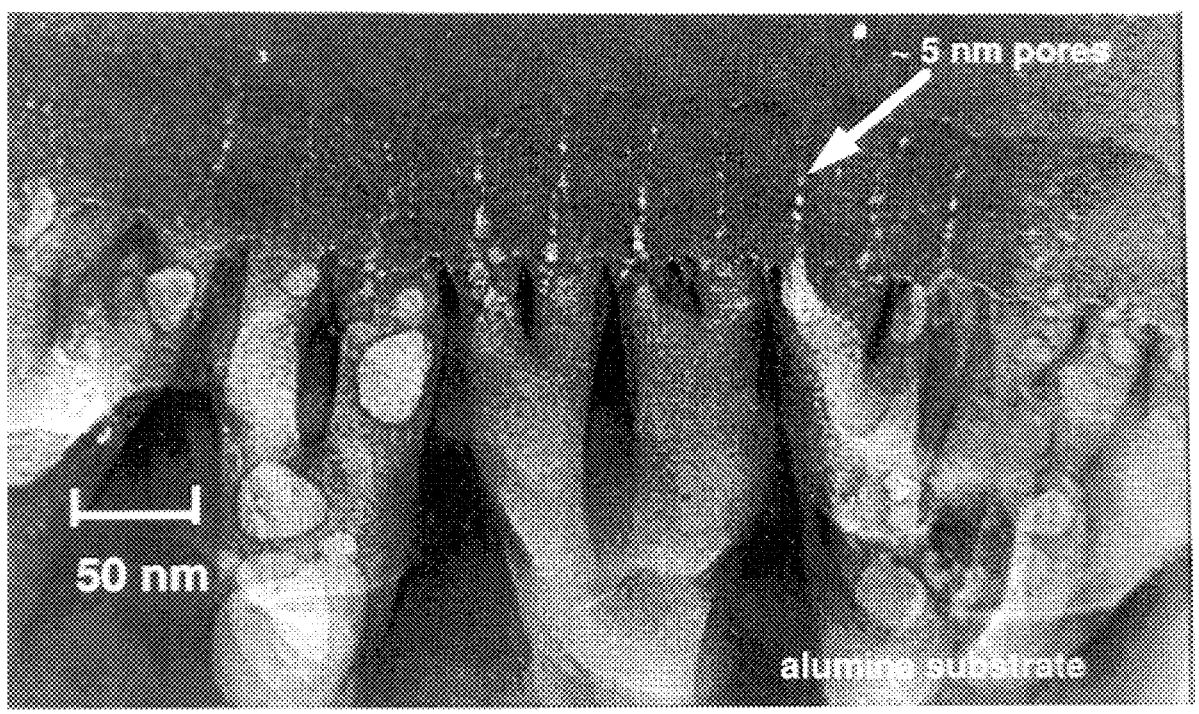
FIG. 2 is a micrograph sectional view of an alumina substrate and a carbon coating deposited by magnetron sputtering at an oblique angle, depicting a preferred aspect of the present invention.

A micrograph sectional view of an alumina substrate and a carbon coating deposited by magnetron sputtering at an oblique angle is shown in FIG. 2. The carbon coating includes a plurality of very small (about 5 nm) pores supported on the alumina substrate. These very small pores are in flow communication with larger columnar pores through the alumina substrate.

A sectional view depicting a membrane module for separation of one or more condensable compounds from a gaseous mixture of two or more compounds of differing volatilities in accordance with the present invention is shown in FIG. 3. Within module 11 a membrane 12 comprising a porous structure of the present invention is in flow communication with sweep chamber 14 below the membrane and chamber 24 above the membrane. The gaseous mixture to be separated is fed through conduit and flow distributor 26, and outwardly across coating 22. Retenate passes out of chamber 24 through outlet conduit 28. A gaseous sweep, such as a diluent gas and/or product stream, is circulated into the sweep chamber through conduit 16. Permeate and sweep are exhausted from chamber 14 through conduit 18.

One class of materials suitable for substrate use, is described, as a separation membrane including a glassy microporous membrane and a ceramic porous support, in U.S. Pat. No. 4,689,150 in the names of Fumio Abe and Tadashi Fujita, assigned to NGK Insulators, Ltd., Japan, which patent is specifically incorporated herein in its entirety by reference. Membranes of Abe et al., said to be suitable for separation by gaseous diffusion of the constituents of a mixture, are preferably provided with a metallic or ceramic microporous membrane vapor-deposited on the surface of the glassy microporous membrane. According to Abe et al., "where the average pore size in the microporous membrane is smaller than 5 Angstroms (50 nanometers) the gas-permeation rate is so low that practicability will be demolished, while when larger than 2,000 Angstroms (20,000 nanometers) the gas-separability will be too much deteriorated . . . . A preferable thickness of the vapor-deposited membrane is in the range between about 10 Angstroms and about 100 microns, and as a material therefor, can be used not only oxides, carbides and nitrides but also metals and inter-metallic compounds". Abe et al. did not disclose or suggest any possibility of using their separation membrane as a substrate for a coating layer having a pore structure of small dimensions than the pore structure of the Abe et al. membrane, i.e. pore structure of small dimensions than in a range of 50 nanometers to 20,000 nanometers.

Suitable substrate materials are also described in Japanese Laid-Open Patent Application (Kokai) No. 61-328303, Oct. 23, 1986, assigned to Mitsubishi Heavy Industries. A method is reported for manufacture of porous membrane of 10 to 500 Angstrom thickness which is said to be formed by chemical vapor deposition on the surface of a porous base material having pore diameters of 0.1 to 10 $\mu$m. More recently, another method for manufacture of suitable porous substrate materials is reported in Japanese Laid-Open Patent Application (Kokai) No. 3-242231, Oct. 29, 1991, also assigned to Mitsubishi Heavy Industries. This Japanese application describes a ceramic separation membrane with a porous metallic support which is said to be obtained by vacuum deposition of aluminum on the surface of a porous metallic body, after which the material is subjected to heating and diffusion treatment in a vacuum. After treatment in a vacuum, an oxide treatment forms an $\alpha$-alumina layer on the surface inside the pores of the metallic support. The resulting material is used, according to the application, with a separation membrane having silicon groups on the surface thereof.

Porous membranes of very fine porosity and processes for the production thereof are the subject of U.S. Pat. No. 3,022,187 in the names of Charles Eyraud, Marcel Prettre, Yves Trambouze, Jeannine Lenoir and Germaine Thomas, assigned to Commissariat a l'Energie Atomique, Paris, France, which patent is specifically incorporated herein in its entirety by reference. Membranes of Eyraud et al., said to be suitable for ultrafiltration and separation by gaseous diffusion of the constituents of a mixture, are prepared by processes characterized in that, in the interior of a rigid support having relatively large pores, another membrane is constructed of very fine porosity by filling the relatively large pores with submicronic grains having very fine channels between them. Deposit of the grains may be obtained by suction of a solid-gas or solid-liquid suspension through the porous support. If desired, the assembly thus formed may be covered with a thin metallic film having a thickness for from 500 to 5000 Angstroms, which is to protect the fine grains without impairing porosity.

The following examples will serve to illustrate certain specific embodiments of the herein disclosed invention. These examples should not, however, be construed as limiting the scope of the novel invention, as there are many variations which may be made thereon without departing from the spirit of the disclosed invention, as those of skill in the art will recognize.

EXAMPLES OF THE INVENTION

General

Laboratory apparatus used in these experiments consisted of an upper chamber and a lower chamber separated by a thin membrane material which included a composite porous structure material as follows:

(i) a porous anodized alumina substrate having a thickness of about 60 microns and generally columnar pores having diameters of about 200 nm, which on one side are in flow communication with a plurality of pores having diameters of from about 50 to 20 nm;

(ii) a coating layer of porous carbon deposited about 50 to about 80 nm over the side of the substrate with the 50 to 20 nm pores by a sputtering gun such that the thickness of the coating layer was about 10 to 100 nm with a pore size necking down from about 50 to 20 nm to a plurality of about 5 nm pores. Sputtering time to deposit carbon layer was 120 min. and 90 min.; and (iii) a thin annular polypropylene wafer on the reverse side of the alumina substrate from the coating layer.

Feed-streams and effluents were analyzed by gas chromatography and results are given in volume percent.

A laboratory screening apparatus was constructed whereby the membrane was supported horizontally on a porous stainless steel disk and held between sealing surfaces from above and below. Provisions were made for measured amounts of two gas mixtures to be mixed through a static mixer and brought along the axis of the membrane onto the superior surface of the membrane. The membrane, having been primed with a suitable liquid, condensed the gas components of lower volatility within its pores and transferred them across the membrane. Non-condensed material was vented through a bubbler filled with vacuum pump oil. A stream of nitrogen gas (any other gas is also suitable) was heated and swept along the inferior surface of the membrane to provide the heat of vaporization to the lower volatility compounds being transferred across the membrane. This stream was passed through a carbon dioxide/acetone cold trap to condense the compounds which had been transferred. This stream was also vented through a bubbler filled with vacuum pump oil. Gas samples were taken of the streams before and after contact with the superior membrane surface and after contact with the inferior membrane surface. These were analyzed by gas chromatography on a chromatograph equipped with both a flame ionization detector (FID) and a thermal conductivity detector (TCD). The former was used to detect hydrocarbons. The latter was used to detect fixed gases such as helium, hydrogen, carbon oxides, nitrogen, oxygen, and methane as a tie component with the FID analysis. The instrument was calibrated with multiple calibration standards.

Example 1

Porous structures according to the present invention, for use in the following examples of the invention, were prepared at Los Alamos National Laboratory as described in this example. Carbon films were deposited on an anodized alumina substrate having generally straight pores with approximately uniform channel dimensions. Substrates used were Anodisc (R) 47 filters available from Whatman International, Ltd. (containing channels 200 nanometers in diameter and 60 microns in length with 20 nanometer diameter pores in a membrane surface layer approximately 100 nm thick on one side of the filter). These Anodisc (R) filters include an Anopore (R) membrane with an integral polypropylene ring support. The pore size distribution was generally uniform and the pores were relatively straight. Carbon films were deposited with a 10 centimeter (cm) diameter RF powered magnetron sputter gin in a high vacuum ($10^{-6}$ to $10^{-7}$ Torr) system.

Substrates were disposed at an angle with respect to the axis of the gun. Sputter conditions included argon pressures of about 0.2 Pa and RF power of about 90 watts. Deposition rates were on the order of 100 nm/hr, and the angle of incidence was 75 degrees measured from the perpendicular to the surface to the axis of the gun.

Resultant carbon film deposited on the alumina substrate clearly showed the presence of columnar grains tilted in the direction of the incoming atomic flux. The pore size between grains was estimated at 5 nm.

Several porous structures were prepared as described above, but with rotation of the substrate during deposition. Rotation about an axis perpendicular to the surface during the deposition improved uniformity and altered the microstructure. is Carbon films clearly showed the presence of columnar grains with a pore size on the order of 5 nm, however the grains were oriented normal to the substrate surface. In addition, the rotation led to improved uniformity of deposition across the alumina substrate surface.

Example 2

A membrane of porous structure material, made in accordance with the description of Example 1, was placed in the test apparatus in such a way that the carbon layer faced the chamber below the membrane with the wider pore openings at the bottom of a chamber above the membrane. Effective diameter of the membrane for gas contact was 37 mm (or a surface area of 0.0122 sq-ft). A small amount of toluene (about 2 mL) was poured on top of the membrane to "prime" the pores with liquid.

Nitrogen sweep gas at ambient conditions (1 atm and 70° F.) was passed on the underside of the membrane at a rate of 7.9 standard mL/sec. About 20 mL of n-butane liquid was poured on top of the toluene liquid. After about 15 minutes, the nitrogen effluent from the test apparatus was analyzed by gas chromatography. The effluent contained 10.2 percent n-butane and 5.3 percent toluene.

Example 3

The membrane used in Example 2 was changed with another which had a carbon sputtering time of 90 min. The pore size at the narrower opening of the conical pore was larger than the one used in Example 1. Example 1 was repeated with the same test apparatus and conditions, except the nitrogen rate was reduced to 4 standard mL/sec. Effluent analysis was 40.8 percent n-butane and 3.7 percent toluene.

Example 4

The test apparatus used in Example 2 and Example 3 was modified to provide a continuous addition of hydrocarbon gases to the upper chamber of the apparatus.

A gas mixture containing 8 percent hydrogen, 2 percent nitrogen, 56.3 percent argon, 32 percent methane, 0.7 percent carbon monoxide and 1 percent carbon dioxide, was mixed with n-butane vapors. The mixture composition was 5.3 percent hydrogen, 1.3 percent nitrogen, 37 percent argon, 21 percent methane, 1.1 percent carbon oxides and 34.2 percent n-butane, all in volume percent. As in Example 1, a small amount of toluene was used to prime the pores of the membrane. The hydrocarbon gas mixture was fed at ambient conditions to the upper chamber of the test apparatus. Nitrogen sweep gas at ambient conditions was passed on the underside of the membrane at a rate of 4 standard mL/sec. After about 15 min. the nitrogen effluent from the test apparatus was analyzed. The effluent contained 12.3 percent n-butane, 4.9 percent toluene and 82.7 percent nitrogen. Only trace quantities of methane (less than about 0.05 percent methane by volume) was present in the permeate. This experiment demonstrates the selective transfer of n-butane across the membrane to the exclusion of hydrogen, methane, and argon.

Example 5

The test apparatus used in Example 4 was modified to include a hot water bath at 157° F. to preheat the nitrogen sweep gas. The gas mixture described in Example 4, flowing at a rate of 94 standard mL/min, was mixed with isobutane vapors. The isobutane contained small amounts of n-butane, ethane and propane as contaminants. The nitrogen sweep rate was set at 235 standard mL/min. and was preheated as described above. The experiment described in Example 3 was carried out with these new materials.

The feed mixture to the upper chamber contained 38.62 percent argon, 5.49 percent hydrogen, 1.37 percent nitrogen, 21.95 percent methane, 32.23 percent isobutane, 0.06 percent n-butane, 0.25 percent propane and 0.02 percent ethane. Effluent from the lower chamber contained 73.1 percent nitrogen, 19.8 percent isobutane, 19 percent methane, 1.4 percent n-butane, 0.09 percent propane and 5.43 percent toluene, all in volume percent. The feed mixture leaving the upper chamber had the following analysis: 18.1 percent argon, 2.6 percent hydrogen, 0.6 percent nitrogen, 10.3 percent methane, 0.4 percent propane, 0.1 percent n-butane and 67.4 percent isobutane.

Results of this experiment demonstrate the selective transfer of iso-butane across the membrane to the exclusion of hydrogen and methane.

Example 6

The test apparatus as used in Example 5 was used to separate ammonia vapors from nitrogen gas at ambient conditions. For this example the membrane material in the test chamber was "primed" with water. A gaseous mixture containing 10 percent ammonia and 90 percent nitrogen by volume was fed to the upper chamber of the test apparatus at ambient conditions. A nitrogen sweep gas at about 100° F. and a flow rate of 0.2 standard cu-ft/hr. was fed to the bottom chamber. Effluents from both upper and bottom chambers of the test apparatus were bubbled through 300 mL of 0.1N hydrochloric acid using a fritted tube for 30 min. to scrub out any ammonia present in each effluent. Resulting solutions (Solution A from the upper chamber and Solution B from the lower chamber) from each bubbler was titrated against 0.1N sodium hydroxide to determine the remaining acid still present in the solution.

Solution B consumed 31.7 mL of the hydroxide and Solution A consumed 16.9 mL. The hydrochloric acid equivalent of ammonia in Solution B was 268.3 mL (or 3.26 g of ammonia in 30 min.) and that in Solution A was 283.1 mL (or 3.44 g of ammonia in 30 min.). The calculated ammonia recovery was about 48 percent [326/(3.26+3.44)].

This experiment showed that 48% of the ammonia in the feed was condensed and transferred to the inferior chamber.

Examples 7–13

Test apparatus as used in previous examples was modified to include a diaphragm differential pressure gauge between the upper and lower chambers for measurement of ΔP across the membrane, thermocouples in the chambers to measure temperatures, and improved means for control of gas flows and analysis.

Membranes were primed with n-butane at 40 psig, prior to introduction of feed into the upper chamber. The feed was 1,000 standard mL/min of a mixture containing 33.91 percent by weight of methane, ethane 32.80 percent by weight of ethane, and 33.29 percent by weight of propane at preselected pressures and temperatures. A nitrogen gas flow of 500 standard mL/min at 25° C. was fed into the other chamber. Results are presented below for these experiments.

Summary of Results from Examples 7–13

| Example | 7 | 8 | 9 | 10 | 11 | 12 | 13 |
|---|---|---|---|---|---|---|---|
| P (psig) | 34 | 50 | 74 | 99 | 99 | 99 | 99 |
| ΔP (psig) | 2 | 2.5 | 1 | 1.5 | 5 | 2 | 1 |
| T (° C.) | −50 | −50 | −50 | −55 | −50 | −50 | −50 |

-continued

| Example | 7 | 8 | 9 | 10 | 11 | 12 | 13 |
|---|---|---|---|---|---|---|---|
| Effluent hydrocarbon composition (weight percent): | | | | | | | |
| Methane | 29.50 | 27.86 | 23.75 | 5.36 | 24.63 | 22.17 | 9.12 |
| Ethane | 33.63 | 33.70 | 29.45 | 18.94 | 33.94 | 31.49 | 21.42 |
| Propane | 36.87 | 38.44 | 46.80 | 75.70 | 42.12 | 46.34 | 69.46 |

While we have described a present preferred embodiment of the invention, it is to be distinctly understood that the invention is not limited thereto, but may be otherwise embodied and practiced within the scope of the following claims.

That which is claimed is:

1. A method for separating one or more condensable compounds from a gaseous mixture of two or more compounds of differing volatilities, comprising:

(a) providing a composite porous structure prepared by depositing a coating to one side of a substrate having a defined pore structure, to obtain a composite having a tapered pore structure characterized as tapering from openings of a large dimension at an opposing side of the substrate to smaller openings at the coated side;

(b) priming the pore structure with a liquid solvent;

(c) contacting, under condensing conditions, the coated side of the composite porous structure with a gaseous mixture comprising vapors of a more volatile component and a less volatile component whereby vapors from the mixture are permitted to condense, at least in part, substantially in and adjacent to the openings at the coated side, and to flow in a condensed liquid state, substantially in the absence of vapor, from the openings at the coated side to the openings at the opposing side; and (d) maintaining conditions of a gaseous sweep adjacent the opposing side of the composite porous structure, whereby the liquid condensate in and adjacent to the openings at the opposing side is caused to evaporate.

2. The method of claim 1 wherein the substrate is an alumina filter, the openings of a large dimension are in a range from about 100 nanometers to about 500 nanometers, and the smaller openings provided by the coating are of from about 4 nanometers to about 5 nanometers.

3. A method for separating one or more condensable compounds from a gaseous mixture of two or more compounds of differing volatilities, comprising:

(a) providing a composite porous structure prepared by depositing a coating to one surface of a substrate having a defined pore structure, wherein the deposition is carried out by sputtering or evaporation at an oblique angle of from about 45 to 85 degrees from the perpendicular to the surface, and at temperatures and pressures sufficient to form a composite which has a tapered pore structure characterized as tapering from openings of a large dimension at an opposing surface of the substrate to openings of a smaller dimension provided by the coating;

(b) contacting, under condensing conditions, the coated side of the composite porous structure with a gaseous mixture comprising vapors of a more volatile component and a less volatile component whereby vapors from the mixture are permitted to condense, at least in part, substantially in and adjacent to the openings at the coated side, and to flow in a condensed liquid state, substantially in the absence of vapor, from the openings at the coated side to the openings at the opposing side; and (c) maintaining conditions of a gaseous sweep adjacent the opposing side of the composite porous structure, whereby the liquid condensate in and adjacent to the openings on the opposing side is caused to evaporate.

4. The method of claim 3 wherein the coating is carbon.

5. The method of claim 4 wherein the openings provided by the coating have pore dimensions of from about 4 nanometers to about 5 nanometers.

6. The method of claim 3 wherein the substrate is rotated about an axis perpendicular to the surface during the deposition.

7. The method of claim 6 wherein the substrate is an alumina filter, and the openings of a large dimension are in a range from about 100 nanometers to about 500 nanometers.

8. The method of claim 3 wherein the substrate is an alumina filter having a bulk structure of generally columnar pores from about 100 nanometers to about 500 nanometers in diameter, which contract, near one side of the filter, to a plurality of smaller pores from about 10 nanometers to about 50 nanometers diameter, and the coating is deposited on the side of the filter with the smaller pores.

9. The method of claim 3 further comprising:

(c) removing from the opposing side of the composite porous structure the adjacent gaseous sweep which contains a higher concentration of the more volatile component relative to the less volatile component therein; and (d) removing from adjacent to the coated side a gaseous product containing a lower concentration of the more volatile component relative to the less volatile component.

10. The method of claim 9 wherein the substrate is an alumina filter having a bulk structure of generally columnar pores from about 100 nanometers to about 500 nanometers in diameter, which contract, near one side of the filter, to a plurality of small pores from about 10 nanometers to about 50 nanometers diameter, and the coating is deposited on the side of the filter with the small pores.

11. The method of claim 10 wherein the substrate is rotated about an axis normal to the surface substantially throughout the deposition.

12. The method of claim 10 wherein the coating layer is carbon.

13. A membrane for separating one or more condensable compounds from a gaseous mixture of two or more compounds of differing volatilities, comprising a composite porous structure formed by a process which comprises:

depositing a coating to one surface of a substrate having a defined pore structure, wherein the substrate is rotated about an axis normal to the surface during the deposition which is carried out by sputtering or evaporation at an oblique angle of from about 45 degrees to 85 degrees from the perpendicular to the surface, and at temperatures and pressures sufficient to form a composite which has tapered pore structure characterize as tapering from openings of a large dimension at an opposing surface of the substrate to openings of a smaller dimension provided by the coating.

14. The membrane of claim 13 wherein the substrate is an alumina filter having a thickness in the range of from about 10 microns to about 1000 microns and a bulk structure of generally columnar pores with diameter in a range from about 100 nanometers to about 500 nanometers, which columnar pores contract, near one side of he filter, in to a plurality of smaller pores having pore sizes about 0.1 the diameter of the columnar pores.

15. The membrane of claim 13 wherein the deposition is at the oblique angle of from about 70 degrees to 80 degrees from the perpendicular to the surface.

16. The membrane of claim 13 wherein the substrate is an alumina filter having a bulk structure of generally columnar pores about 200 nanometers in diameter, which contract, near one side of the filter, to a plurality of small pores of about 20 nanometers in diameter.

17. The membrane of claim 16 wherein the coating is of carbon deposited on the side of the filter having the small pores, and the openings of smaller dimension provided by the coating are characterized as having dimensions of from about 4 nanometers to about 5 nanometers.

18. The membrame of claim 13 wherein the openings of smaller dimensions provided by the coating are from about 4 nanometers to about 5 nanometers.

19. A process of forming a composite porous structure for separating one or more condensable compounds from a gaseous mixture of two or more compounds of differing volatilities comprising:

depositing a coating to one surface of a substrate having a defined pore structure, wherein the substrate is rotated about an axis normal to the surface during the deposition which is carried out by sputtering or evaporation at an oblique angle of from about 45 to 85 degrees from the perpendicular to the surface, and at temperatures and pressures sufficient to form a composite which has a tapered pore structure characterized as tapering from openings of a large dimension at an opposing surface of the substrate to opening of a smaller dimension at the coated surface.

20. The process of claim 19 wherein the substrate is an alumina filter having a thickness in the range of from about 10 microns to about 1000 microns and a bulk structure of generally columnar pores with diameter in a range from about 100 nanometers to about 500 nanometers, which columnar pores contract, near one side of the filter, in to plurality of smaller pores having pore sizes about 0.1 the diameter of the columnar pores.

21. The process of claim 20 wherein the coating is carbon deposited on the side of the filter with the smaller pores.

22. The process of claim 19 wherein the openings of smaller dimensions are from about 4 nanometers to about 5 nanometers.

* * * * *

UNITED STATES PATENT AND TRADEMARK OFFICE
CERTIFICATE OF CORRECTION

PATENT NO. : 6,039,792
DATED : March 21, 2000
INVENTOR(S) : Narasimhan Calamur, Martin E. Carrera, David J. Devlin, Tom Archuleta Page 1 of 4

It is certified that error appears in the above-identified patent and that said Letters Patent is hereby corrected as shown below:

Patent reads:

| Col. | Line | |
|---|---|---|
| 1 | 22 | "methods forming and using"<br><br>should read:<br>"methods of forming and using" |
| 1 | 36 | "structure smaller dimension"<br><br>should read:<br>"structure of a smaller dimension" |
| 5 | 13 | "Lee and Hwang, measured"<br><br>should read:<br>"Lee and Hwang measured" |
| 5 | 65 | "Membranes, J. Membrane"<br><br>should read:<br>"Membranes", J. Membrane" |

UNITED STATES PATENT AND TRADEMARK OFFICE
CERTIFICATE OF CORRECTION

PATENT NO.: 6,039,792

Page 2 of 4

DATED: March 21, 2000

INVENTOR(S): Narasimhan Calamur, Martin E. Carrera, David J. Devlin, Tom Archuleta It is certified that error appears in the above-identified patent and that said Letters Patent is hereby corrected as shown below:

Patent reads:

| Col. | Line | | |
|------|------|---|---|
| 6 | 39 | "preferably in range from" | |
| | | should read: | |
| | | "preferably in a range from" | |
| 10 | 32 | "include alumina,. silica," | |
| | | should read: | |
| | | "include alumina, silica," | |
| 11 | 39,40 | "use, is described, as a" | |
| | | should read: | |
| | | "use is described as a" | |
| 13 | 62,63 | "microstructure. is Carbon films" | |
| | | should read: | |
| | | "microstructure. Carbon films" | |

UNITED STATES PATENT AND TRADEMARK OFFICE
CERTIFICATE OF CORRECTION

PATENT : 6,039,792
DATED : March 21, 2000
INVENTOR(S): Narasihan Calamur, Martin E. Carrera, David J. Devlin, Tom Archuleta It is certified that error appears in the above-identified patent and that said Letters Patent is hereby corrected as shown below:

| Col. | Line |  |
|------|------|--|
| 18 | 1,2 | "characterize as tapering"<br><br>should read:<br>"characterized as tapering" |
| 18 | 10 | "side of he filter,"<br><br>should read:<br>"side of the filter," |

UNITED STATES PATENT AND TRADEMARK OFFICE
CERTIFICATE OF CORRECTION

PATENT : 6,039,792

DATED : March 21, 2000

Page 4 of 4

INVENTOR(S): Narasimhan Calamur, Martin E. Carrera, David J. Devlin, Tom Archuleta It is certified that error appears in the above-identified patent and that said Letters Patent is hereby corrected as shown below:

| | | |
|---|---|---|
| 18 | 43 | "opening of a smaller" |
| | | should read: |
| | | "openings of a smaller" |
| 18 | 50,51 | "in to plurality" |
| | | should read: |
| | | "in to a plurality" |

Signed and Sealed this

Twenty-fourth Day of April, 2001

Attest:

NICHOLAS P. GODICI

Attesting Officer

Acting Director of the United States Patent and Trademark Office